US010345916B2

(12) United States Patent
Gu

(10) Patent No.: US 10,345,916 B2
(45) Date of Patent: Jul. 9, 2019

(54) INPUT DEVICE WITH BENDABLE SUPPORT MECHANISM FOR A COMPUTING DEVICE

(71) Applicant: MICROSOFT TECHNOLOGY LICENSING, LLC, Redmond, WA (US)

(72) Inventor: Jiawei Gu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/517,379

(22) Filed: Oct. 17, 2014

(65) Prior Publication Data

US 2015/0293601 A1    Oct. 15, 2015

(51) Int. Cl.
*G06F 3/02* (2006.01)
*G06F 1/16* (2006.01)

(52) U.S. Cl.
CPC .......... *G06F 3/0202* (2013.01); *G06F 1/1669* (2013.01); *G06F 1/1679* (2013.01)

(58) Field of Classification Search
CPC ............................. G06F 3/0202; G06F 1/1669
See application file for complete search history.

(56) References Cited

U.S. PATENT DOCUMENTS

| | | | |
|---|---|---|---|
| 5,383,138 A | * | 1/1995 | Motoyama ............... E05C 1/16 361/679.27 |
| 5,502,460 A | * | 3/1996 | Bowen ................. G06F 3/0202 345/168 |
| 5,661,798 A | * | 8/1997 | Chen ................... H04B 1/3833 379/446 |
| 5,943,041 A | | 8/1999 | Allison et al. |

(Continued)

FOREIGN PATENT DOCUMENTS

| CN | 101354649 | 1/2009 |
|---|---|---|
| CN | 201477524 | 5/2010 |

(Continued)

OTHER PUBLICATIONS

"International Search Report and Written Opinion", Application No. PCT/CN2014/089867, dated Jun. 26, 2015, 15 pages.

(Continued)

*Primary Examiner* — Nitin Patel
*Assistant Examiner* — Robert M Stone
(74) *Attorney, Agent, or Firm* — Schwegman Lundberg & Woessner, P.A.

(57) ABSTRACT

An input device with a bendable support mechanism for a computing device is described. In one or more implementations, an input device includes a housing, input functionality available via a surface of the housing, and a support mechanism. The input functionality is configured to initiate one or more inputs that are configured to be communicatively coupled to a computing device to initiate one or more operations of the computing device. The support mechanism configured to assume a closed configuration in which a majority of the support mechanism is disposed within the housing and an open configuration in which the support mechanism is disposed outside of the housing and arranged as forming a bend to support a rear of a computing device having a slate configuration.

18 Claims, 5 Drawing Sheets

(56) References Cited

U.S. PATENT DOCUMENTS

| | | | | |
|---|---|---|---|---|
| 6,108,200 | A | * | 8/2000 | Fullerton ............... G06F 1/1632 235/145 R |
| 6,174,097 | B1 | * | 1/2001 | Daniel .................. G06F 3/0221 400/472 |
| D457,525 | S | * | 5/2002 | Olodort ........................ D14/396 |
| 6,457,996 | B1 | * | 10/2002 | Shih ..................... G06F 1/1626 361/679.15 |
| 6,700,775 | B1 | * | 3/2004 | Chuang ................. G06F 1/1626 361/679.01 |
| 6,734,809 | B1 | * | 5/2004 | Olodort ................. G06F 3/0221 341/22 |
| 6,798,649 | B1 | * | 9/2004 | Olodort ................. G06F 1/1618 235/61 R |
| 6,839,002 | B2 | * | 1/2005 | Olodort ................. G06F 3/0221 341/22 |
| 6,882,524 | B2 | * | 4/2005 | Ulla ..................... G06F 1/1626 345/169 |
| 6,986,492 | B2 | * | 1/2006 | Huang .................. G06F 1/1632 248/346.03 |
| 7,025,274 | B2 | | 4/2006 | Solomon et al. |
| D658,188 | S | * | 4/2012 | Diebel ........................ D14/440 |
| 8,264,310 | B2 | | 9/2012 | Lauder et al. |
| 8,599,542 | B1 | | 12/2013 | Healey et al. |
| 8,724,300 | B2 | * | 5/2014 | Smith ................... G06F 1/1628 206/320 |
| 8,746,446 | B2 | * | 6/2014 | Chiang ................. G06F 1/1628 206/320 |
| 8,766,921 | B2 | | 7/2014 | Ballagas et al. |
| 8,839,953 | B2 | | 9/2014 | Igarashi |
| 9,227,763 | B2 | * | 1/2016 | Gengler ................. B65D 25/00 |
| 9,532,631 | B2 | * | 1/2017 | Gu ........................ A45C 11/00 |
| 2004/0195305 | A1 | * | 10/2004 | Dotson ................. G06F 1/1632 235/145 R |
| 2005/0002158 | A1 | * | 1/2005 | Olodort ................. G06F 1/1616 361/679.15 |
| 2005/0258021 | A1 | * | 11/2005 | Liu ....................... G06F 3/0221 200/5 A |
| 2006/0018089 | A1 | * | 1/2006 | Chou .................... G06F 1/1626 361/679.09 |
| 2006/0050018 | A1 | * | 3/2006 | Hutzel .................. B60K 35/00 345/60 |
| 2006/0192689 | A1 | * | 8/2006 | Wang .................... G06F 1/1632 341/22 |
| 2007/0021012 | A1 | * | 1/2007 | Ogawa .................. F16M 11/10 439/687 |
| 2009/0001232 | A1 | * | 1/2009 | Seo ....................... G06F 1/1616 248/176.1 |
| 2009/0159763 | A1 | * | 6/2009 | Kim ...................... F16M 13/00 248/174 |
| 2009/0283654 | A1 | * | 11/2009 | Hu ........................ A47B 97/04 248/448 |
| 2010/0001163 | A1 | * | 1/2010 | Takizawa ............. F16M 11/105 248/371 |
| 2011/0050063 | A1 | * | 3/2011 | Wang ................... H04N 1/00127 312/351.1 |
| 2012/0009000 | A1 | | 1/2012 | Starrett |
| 2012/0037285 | A1 | * | 2/2012 | Diebel .................. A45C 11/00 150/165 |
| 2012/0125791 | A1 | * | 5/2012 | Parker .................. F16M 11/10 206/45.2 |
| 2012/0176742 | A1 | * | 7/2012 | Luo ........................ G06F 1/166 361/679.26 |
| 2012/0194448 | A1 | * | 8/2012 | Rothkopf ............. A45C 13/002 345/173 |
| 2012/0199501 | A1 | * | 8/2012 | Le Gette ................ F16M 11/04 206/45.24 |
| 2012/0211377 | A1 | | 8/2012 | Sajid |
| 2012/0300383 | A1 | * | 11/2012 | Lauder .................. G06F 1/1647 361/679.26 |
| 2013/0016468 | A1 | * | 1/2013 | Oh ........................ G06F 1/1632 361/679.12 |
| 2013/0077211 | A1 | * | 3/2013 | Wang .................... F16M 13/005 361/679.01 |
| 2013/0087517 | A1 | * | 4/2013 | Zhong ................... G06F 1/1637 211/26 |
| 2013/0088431 | A1 | * | 4/2013 | Ballagas ............... G06F 1/1626 345/168 |
| 2013/0107438 | A1 | | 5/2013 | Lee et al. |
| 2013/0128453 | A1 | * | 5/2013 | Lin ....................... G06F 1/1632 361/679.56 |
| 2013/0140203 | A1 | * | 6/2013 | Chiang ................. G06F 1/1628 206/320 |
| 2013/0175909 | A1 | | 7/2013 | Wang et al. |
| 2013/0270980 | A1 | * | 10/2013 | Hsu ........................ H05K 5/03 312/223.1 |
| 2013/0277271 | A1 | | 10/2013 | Toulotte |
| 2013/0293430 | A1 | * | 11/2013 | Henty .................... H01F 38/14 343/720 |
| 2013/0334020 | A1 | | 12/2013 | Lan |
| 2014/0029189 | A1 | * | 1/2014 | Chang ................... G06F 1/1662 361/679.11 |
| 2014/0055937 | A1 | * | 2/2014 | Wang .................... G06F 3/0202 361/679.17 |
| 2014/0071607 | A1 | * | 3/2014 | Frinak .................. G06F 1/1624 361/679.09 |
| 2014/0083883 | A1 | * | 3/2014 | Elias .................... G06F 1/1626 206/320 |
| 2014/0124396 | A1 | * | 5/2014 | Igarashi .................. H05K 5/03 206/320 |
| 2014/0211445 | A1 | * | 7/2014 | Hirai .................... G06F 1/1654 361/809 |
| 2014/0216954 | A1 | * | 8/2014 | Law .......................... A45F 5/02 206/45.23 |
| 2014/0218855 | A1 | | 8/2014 | Fujino |
| 2014/0298062 | A1 | | 10/2014 | Lee |
| 2014/0332418 | A1 | * | 11/2014 | Cheung ................. F16M 11/10 206/45.2 |
| 2015/0049423 | A1 | * | 2/2015 | Hsu ....................... G06F 1/1662 361/679.09 |
| 2015/0055287 | A1 | * | 2/2015 | Seo ....................... G06F 1/1652 361/679.27 |
| 2018/0081402 | A1 | * | 3/2018 | Smith ................... G06F 1/1632 |

FOREIGN PATENT DOCUMENTS

| | | |
|---|---|---|
| CN | 201556164 | 8/2010 |
| CN | 101976099 | 2/2011 |
| CN | 201741069 U | 2/2011 |
| CN | 102156510 A | 8/2011 |
| CN | 202075698 | 12/2011 |
| CN | 202206156 | 4/2012 |
| CN | 102520803 | 6/2012 |
| CN | 202472496 U | 10/2012 |
| CN | 202748732 | 2/2013 |
| CN | 202870736 | 4/2013 |
| CN | 202904485 | 4/2013 |
| CN | 202956726 | 5/2013 |
| CN | 203164868 | 8/2013 |
| CN | 203241925 | 10/2013 |
| CN | 103513715 | 1/2014 |
| CN | 103629493 | 3/2014 |
| EP | 2677515 | 12/2013 |
| WO | WO 2012160327 A1 * | 5/2012 ........... G06F 1/1626 |
| WO | WO-2012160327 A1 * | 11/2012 ........... G06F 1/1626 |
| WO | WO-2014177047 A1 * | 11/2014 ........... G06F 3/0208 |

OTHER PUBLICATIONS

"7 Genius Tablet Cover Features", retrieved from http://www.ebay.com/gds/7-Genius-Tablet-Cover-Features-/10000000177629377/g.html on Oct. 29, 2014, Apr. 28, 2014, 6 pages.

"Flexible Water Resistant Full Size Keyboard USB", Retrieved from <http://www.fentek-ind.com/kbflusbps2b.htm#.VFCJpbUcwnt>, Jan. 26, 2013, 6 pages.

"Getting started with Logitech® Fold-Up Keyboard", Retrieved from <http://www.logitech.com/assets/42319/fold-up-keyboard-for-ipad-2-quick-start-guide.pdf>, May 27, 2012, 12 pages.

(56) References Cited

OTHER PUBLICATIONS

"Iwerkz Universal Foldable Bluetooth Keyboard", Retrieved from <http://mywerkz.com/wordpress/wp-content/uploads/2013/10/44652_Manual_FoldGuide_9_23A.pdf>, 2014, 2 pages.
"KeyFolio Thin X2™ for iPad® Air", retrieved from http://www.kensington.com/ce/ca/v/4462/1758/keyfolio-thin-x2™-for-ipad®-air#.VFBuffnLcpo on Oct. 29, 2014, 3 pages.
"Moko Slim Case with Wakeup Feature for the Google Nexus 7 tablet", article and video retrieved from http://www.youtube.com/watch?v=nZSqbmGuPjs on Oct. 29, 2014, Aug. 8, 2012, 2 pages.
"SAVFY® Google NEXUS 7 Flip Stand Leather Folio Case Cover Multi-Function Smart Cover with Magnetic Auto Sleep and Wake up Sensor, Free Bonus: Clear Screen Protector + SAVFY Cleaning Cloth for Google Nexus 7 Asus Tablet Android 4.1 Jellybean 8GB / 16GB/32GB", retrieved from http://www.amazon.co.uk/SAVFY®-Google-Leather-Multi-Function-Magnetic/dp/B00F36H4AK on Oct. 29, 2014, 4 pages.
"USRobotics Adds 360° Rotating Folio Case/Stand for the iPad 2 to Tablet Accessory Product Portfolio", retrieved from http://usr-lat.com/press/pr-press-release.asp?loc=mxco&prid=679 on Oct. 29, 2014, Jul. 12, 2011, 2 pages.
"Wireless Bluetooth Mobile Keyboard", Retrieved From: <http://www.verbatim.com/prod/accessories/keyboards/wireless-mobile-keyboard/ > Apr. 14, 2014, Jan. 12, 2011, 1 Page.
Gasior, "MSI's Win8 Tablet Hides Slide-Out Keyboard", Retrieved From: <http://techreport.com/news/23060/msi-win8-tablet-hides-slide-out-keyboard > Apr. 14, 2014, Jun. 7, 2012, 2 Pages.
Jason, "Oyster Ergonomic Keyboard Review", Retrieved from <http://allthingsergo.com/blog/reviews/oyster-ergonomic-keyboard-review/> on Oct. 31, 2014, Oct. 16, 2014, 4 pages.
Kendrick, "Belkin Ultimate Keyboard Case for iPad: It's the magnets (review)", retrieved from http://www.zdnet.com/belkin-ultimate-keyboard-case-for-ipad-its-the-magnets-review-7000013164/ on Oct. 29, 2014, Mar. 27, 2013, 7 pages.
Mastin, "Lenovo Miix 10 Review: A Good Tablet With An (Optional) Killer Keyboard", Retrieved From: <http://www.pcworld.com/article/2060784/lenovo-miix-10-review-a-good-tablet-with-an-optional-killer-keyboard.html> Apr. 14, 2014, Nov. 5, 2013, 5 Pages.
Nguyen, et al., "BendID: flexible interface for localized deformation recognition", In Proceedings of the ACM international Joint Conference on Pervasive and Ubiquitous Computing, Sep. 13, 2014, pp. 553-557.
"International Search Report and Written Opinion", Application No. PCT/CN2014/074979, dated Jan. 27, 2015, 12 pages.
"European Search Report issued in Application No. 14888856.3", dated Feb. 9, 2017, 4 Pages.
"Office Action Issued in European Patent Application No. 14888856.3" dated Mar. 6, 2017, 5 Pages.
Response to Communication filed Apr. 5, 2017 in European Patent Application No. 14888856.3, 21 Pages.
"First Office Action and Search Report Issued in Chinese Patent Application No. 201480037763.1", dated Nov. 16, 2017, 12 Pages.
"Office Action Issued in Chinese Patent Application No. 201480037763.1", dated Apr. 16, 2018, 7 Pages.
"Third Office Action Issued in Chinese Patent Application No. 201480037763.1", dated Sep. 14, 2018, 7 Pages.
"Fourth Office Action Issued in Chinese Patent Application No. 201480037763.1", (w/ Concise Statement of Relevance), dated Mar. 21, 2019, 7 Pages.

* cited by examiner

INPUT DEVICE WITH BENDABLE SUPPORT MECHANISM FOR A COMPUTING DEVICE

PRIORITY APPLICATION

This application claims benefit of priority of PCT Application Serial No. PCT/CN2014/074979 entitled "Input Device with Bendable Support Mechanism for a Computing Device" filed Apr. 9, 2014, the content of which is incorporated by reference herein in its entirety.

BACKGROUND

Users have access to an ever increasing variety of functionality in a variety of different settings. For example, users traditionally interacted with desktop computing devices (e.g., desktop PCs) to perform word processing and so forth. Mobile computing devices were then developed and began with use of simple functionality such as text messages and progressed to advanced functionality including feature-rich applications.

However, the form factor of the mobile computing devices used to promote mobility of the device may limit an ability of a user to interact with this functionality in an efficient manner. For example, use of an onscreen keyboard may limit a user to basic inputs and thus even though an application may support rich features the input techniques made available to a user may limit interaction with these features.

SUMMARY

An input device with a bendable support mechanism for a computing device is described. In one or more implementations, an input device includes a housing, input functionality available via a surface of the housing, and a support mechanism. The input functionality is configured to initiate one or more inputs that are configured to be communicatively coupled to a computing device to initiate one or more operations of the computing device. The support mechanism is configured to assume a closed configuration in which a majority of the support mechanism is disposed within the housing and an open configuration in which the support mechanism is disposed outside of the housing and arranged as forming a bend to support a rear of a computing device having a slate configuration.

In one or more implementations, an apparatus includes a housing, input functionality available via a surface of the housing, and a support mechanism. The input functionality is configured to initiate one or more inputs that are configured to be communicatively coupled to a computing device to initiate one or more operations of the computing device. The support mechanism is configured to assume a closed configuration in which a majority of a support mechanism is disposed within the housing and an open configuration in which the support structure is disposed outside of the housing and arranged to support a rear of a computing device having a slate configuration. The support mechanism is configured to slide out from the closed configuration and is then flexed to form the open configuration.

In one or more implementations, a system includes a computing device having a slate configuration and a keyboard including a housing, input functionality disposed on a surface of the housing. The keyboard includes a support mechanism configured to assume a closed configuration in which the support mechanism is disposed within the housing and an open configuration in which the support mechanism is disposed outside the housing and bent to support a rear of the computing device such that an angle of a display device of the computing device is at an angle greater than ninety degrees to a surface of the input functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

The ways in which a user may interact with a mobile computing device has not followed the increases in functionality of applications made available via mobile computing devices. Accordingly, users of mobile computing devices such as tablets and mobile phones may have access to advanced functionality such as productivity applications (e.g., word processors, presentations, and spreadsheets) but be limited in the ways in which interaction with this functionality may be performed using conventional techniques.

Techniques involving a bendable support mechanism are described. In one or more implementations, an input device such as a keyboard is configured to provide inputs to initiate operations of a computing device and thus increase a user's ability to interact with the computing device over conventional "on screen" techniques. The input device includes a support mechanism that is configured to assume a closed configuration such that the support mechanism may be positioned "out of the way" when not in use and an open configuration in which the support mechanism supports a rear of the computing device.

The support mechanism may be configured in a variety of ways to support these configurations. For example, the support mechanism may be "slid into" the housing of the input device to be placed out of the way as previously described. To use the support mechanism, a user may slide the mechanism out from the input device and then bend it to form a structure configured to support a rear of the computing device. The support mechanism, for instance, may be configured to have a flexible outer layer and a spine that is configured to support a bend having a sufficient strength to support the computing device such that a user may view a display device and type on a keyboard. A variety of other examples are also contemplated, further discussion of which may be found in the following sections and shown in corresponding figure.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
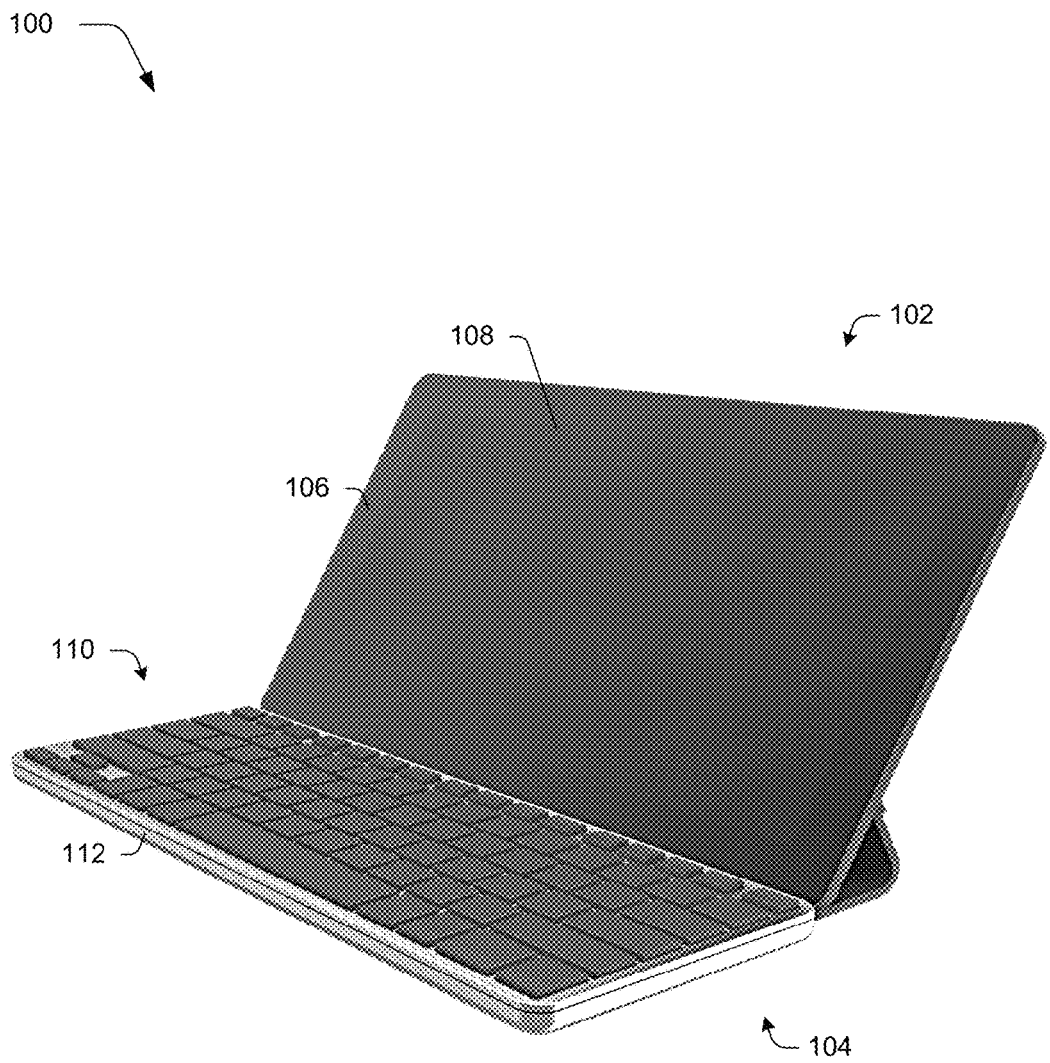
FIG. 1 is an illustration of an environment in an example implementation that is operable to employ the bendable support mechanism techniques.

FIG. 1 is an illustration of an environment 100 in an example implementation that is operable to employ techniques described herein. The illustrated environment 100 includes a computing device 102 and an input device 104. The computing device 102 may be configured in a variety of ways.

For example, a computing device may be configured as a mobile computing device having a housing 106 formed according to a slate configuration. The housing 106 is configured to support a display device 108, which may incorporate touchscreen functionality to support user interaction with a user interface displayed on the display device 108. Mobile computing devices may take a variety of different forms in the slate configuration, such as a tablet, mobile phone, portable game device, portable media player, and so forth. Thus, the computing device 102 may range from full resource devices with substantial memory and processor resources (e.g., tablet computers) to a low-resource device with limited memory and/or processing resources (e.g., traditional portable media players). Further discussion of an example of a computing device 102 may be found in relation to FIG. 7.

The computing device 102 and the input device 104 are arranged in an open configuration in the illustrated example that supports interaction with the display device 106 (e.g., to view the device and/or interact with touchscreen functionality). The open configuration also supports interaction with input functionality 110 of the input device 104.

For example, the input device 104 includes input functionality 110 disposed on a housing 112 of the input device 104. The input functionality 110 is configured to provide one or more inputs to the computing device 104 to initiate one or more operations of the computing device 104. The input functionality 110 may be configured in a variety of ways to accept inputs from a user, such as a keyboard as illustrated, a track pad, functionality configured to detect gestures, a camera, and so on. The inputs may be communicated in a variety of way, such as via a physical communicative coupling, a wireless communicative coupling (e.g., Bluetooth®, Wi-Fi®), and so forth.

Although input functionality has been described, output functionality may also be incorporated by the input device 104 to cause outputs as indicated by the computing device 104. Examples of output functionality include supplemental display devices (e.g., an electronic ink display), speakers, lighted indications, and so on. A variety of other functionality may also be incorporated within the input device 104, such as a supplemental power source, e.g., a battery.

Thus, as illustrated when in the open configuration a user may interact with the computing device 102 directly via the display device 106 and indirectly via the input functionality 110 of the input device 104. The input device 104 is also configured to support the computing device 102 when in the open configuration, such as support placement of the computing device 102 and input device 104 on a surface (e.g., a table, a user's lap) to type on the keyboard and position a surface of the display device 106 at an angle relative to the surface (e.g., as well as a surface of the input functionality 110) that is greater than ninety degrees. Thus, this may support a typing arrangement is which a user may readily interact with a keyboard and have the computing device 102 support by the input device 104 Further description of the open configuration and support functionality of the input device 104 may be found in the following discussion and shown in a corresponding figure.

Figure 2:
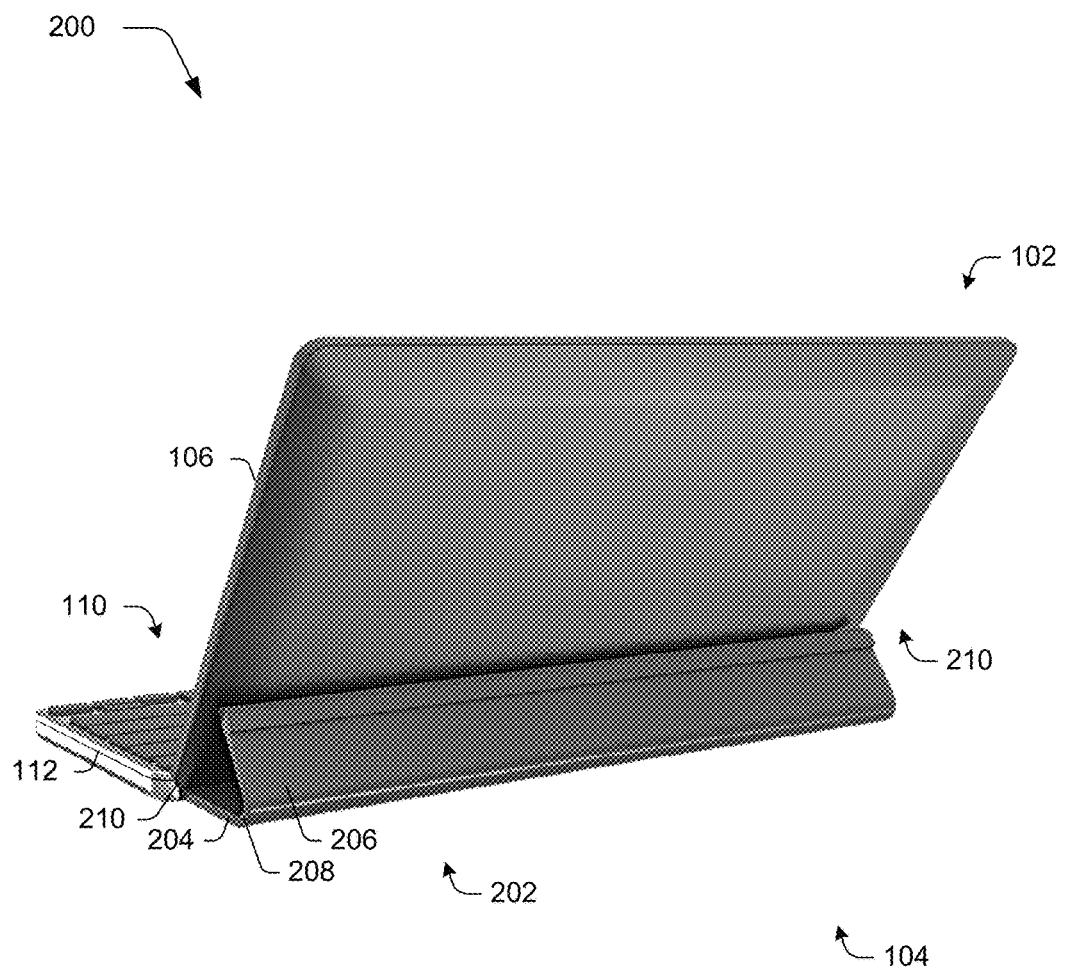
FIG. 2 depicts an example implementation showing a rear view of the computing device and input device of FIG. 1.

FIG. 2 depicts an example implementation 200 showing a rear view of the computing device 102 and input device 104 of FIG. 1. The input device 104 is illustrated as supporting the housing 106 (and more particularly a bottom side that is generally perpendicular to a surface of the display device 108 of FIG. 1) using a support mechanism 202.

The support mechanism 202 includes first and second members 204, 206 that form a bend such that the first and second members 204, 206 have an angle in relation to each other of less than ninety degrees, e.g., approximately forty degrees. The support mechanism 202, when in this open configuration, is thus configured to support a rear side 210 of the computing device 102, i.e., a side of the housing that opposes the display device 108 of FIG. 1.

The bend mechanism 208 may be configured to support a transition between a flat orientation such that a majority of the support mechanism 202 may be stored within the housing 112 of the input device 104 and an open configuration in which the bend mechanism 208 has a sufficient resistance to returning to the flat orientation to support the computing device 102 in the illustrated upright configuration in FIG. 2. In this way, the display device 108 of the computing device may be viewed by a user when interacting with the input functionality 110 in a variety of different scenarios, such as when placed on a surface such as a desktop, a user's lap, and so on. Further discussion of a transition between open and closed configurations is discussed in relation to FIGS. 3-6 in the following.

The input device 104 may be communicatively coupled to the computing device 102 in a variety of ways. For example, the input device 104 may include a connection portion 210 that is configured to have a complementary shape of the bottom side of the housing 106 of the computing device 102, such as to include a raised portion (e.g., a "lip") such that the housing 106 may be placed within the complementary shape.

The support mechanism 202 may also be configured such that the bottom side of the computing device 102 rests against a surface of the first member 204 of the support mechanism 202. The computing device 102 may also be held in place in this example by an adjacent side of the housing 112 of input device 104. In this way, the computing device 102 may be secured by the input device 104.

The connection portion 210 may support techniques to physically and removably secure the connection portion 210 to the housing 106 of the computing device 102. For example, a mechanical latch may be employed in which a tab is secured within a cavity that is moveable via a sliding button, magnetic attraction may be employed (e.g., one or more magnets may be employed by the computing device 102 and/or the input device 104), and so forth. Thus, when secured the combination of the computing device 102 and the input device 104 may be moved as a single unit by a user by grasping either one of the computing device 102 or the input device 104. Further, the techniques to physically and removably secure the connection portion 202 to the housing 106 may be utilized by a user without the use of tools.

The connection portion 210 may also be configured to support a physical communicative coupling between the input device 104 and the computing device 102. For example, the connection portion 210 may include one or more communication contacts that are configured to communicate inputs received from the input functionality 110 to the computing device 108 and vice versa. As previously described, the input device 104 may also be configured to support wireless communication techniques.

Figure 3:
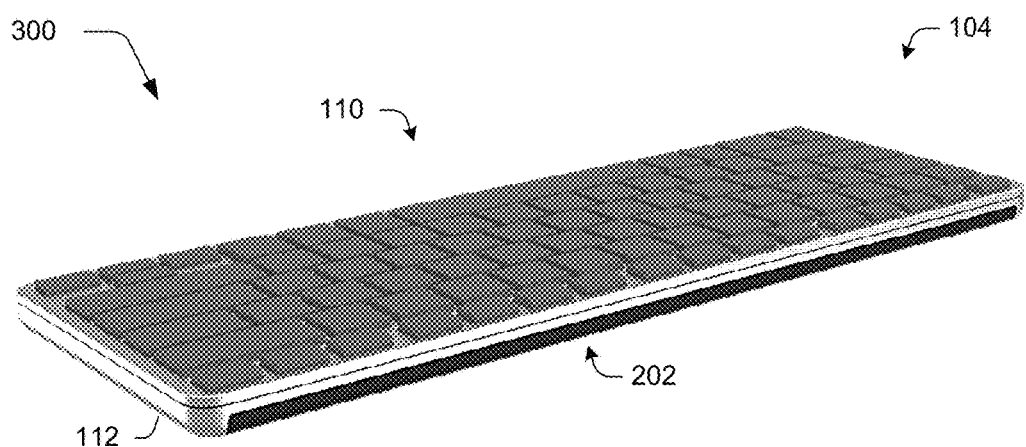
FIGS. 3 and 4 depict examples implementations of the input device of FIG. 2 as having a support mechanism arranged in a closed configuration.
Figure 4:
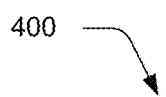
Figure 4:
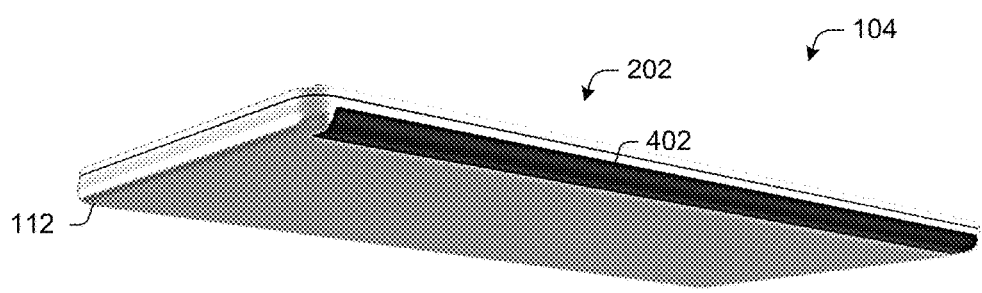

FIGS. 3 and 4 depict examples implementations 300, 400 of the input device 104 as having the support mechanism 202 arranged in a closed configuration. As illustrated, a majority of the support mechanism 202 is disposed within the housing 112 of the input device 104. In this way, the support mechanism 202 is positioned out of the way when in the closed configuration, such as for storage of the input device 104, carrying around when not in use, and so on.

The support mechanism 202 includes a ridge 402 that is configured to be grasped by one or more hands of a user. The user may then withdraw (e.g., slide out) the support mechanism 202 from the housing 112 to expose the support mechanism 202 external to the housing 112, an example of which is described in the following and shown in a corresponding figure.

Figure 5:
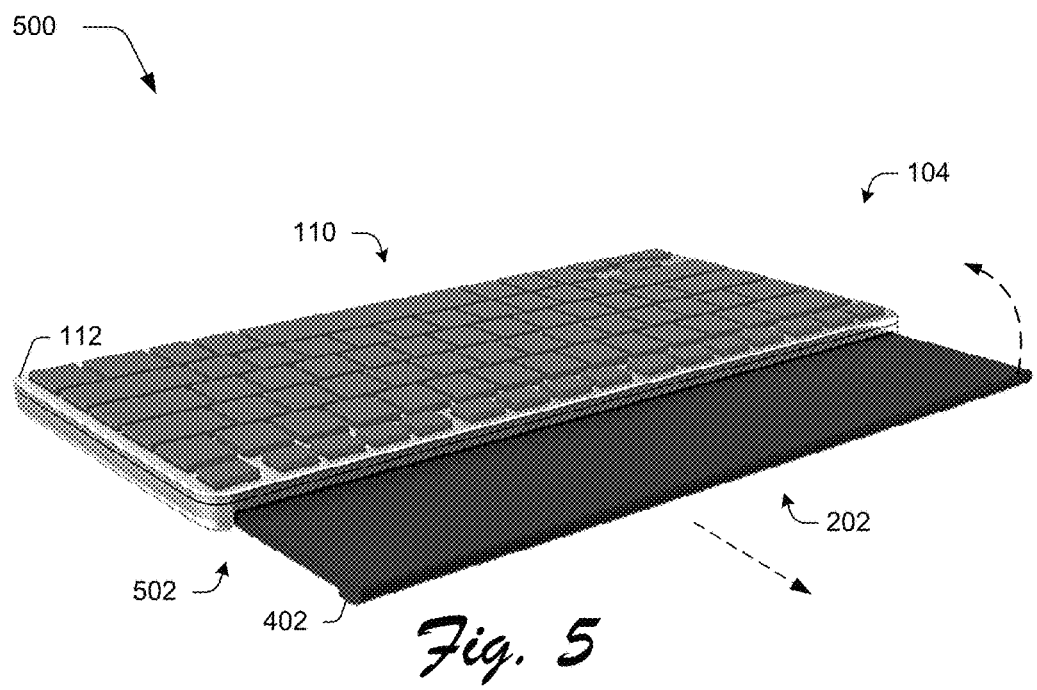
FIG. 5 depicts an example implementation in which the support mechanism is withdrawn from the housing of the input device.

FIG. 5 depicts an example implementation 500 in which the support mechanism 202 is withdrawn from the housing 112 of the input device 104. In this example, the support mechanism 202 slides out from an opening in a side 502 of the housing that is generally perpendicular to a surface of the input functionality 110. This may be performed in a variety of ways, such as by grasping the ridge 402 with a fingernail and pulling it away from the housing 112 as illustrated by the straight phantom arrow in the figure.

The support mechanism 202, when exposed, may then be bent to form the open configuration. For example, the second member 206 may be grasped and bent back toward the housing 112 of the input device 102. This causes the bend mechanism 208 to flex thereby disposing the second member 206 at an angle in relation to the first member 204, as opposed to the generally flat (e.g., aligned along a single plane) configuration in the closed configuration of FIGS. 3 and 4 and the illustrated extended configuration of FIG. 5.

Figure 6:
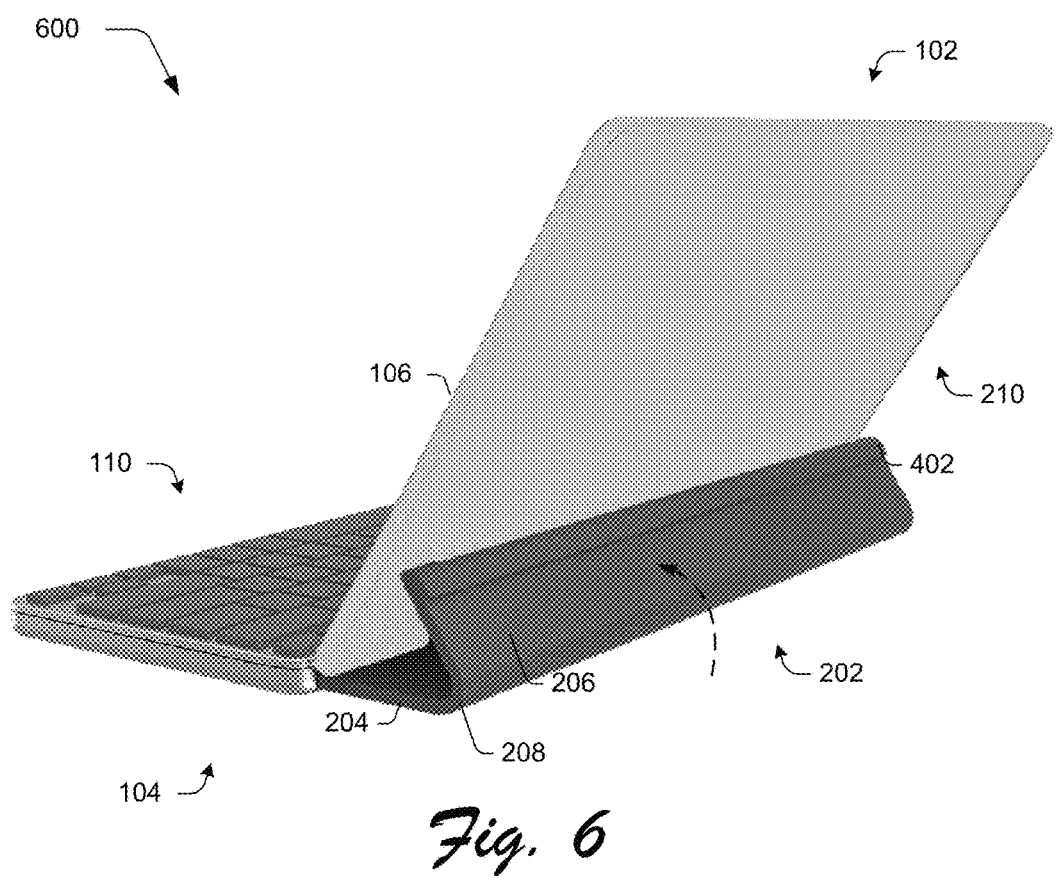
FIG. 6 depicts an example implementation showing a result of flexing of the support mechanism of FIG. 5 to form the open configuration.

FIG. 6 depicts an example implementation 600 showing a result of flexing of the support mechanism to form the open configuration. As illustrated, the bend mechanism 208 is configured to form an arc (e.g., a curved portion) as the bend between the first and second members 204, 206 of the support mechanism 202. The support mechanism 202 may thus be configured in the open configuration to support the computing device 102 upright for interaction, such as to support typing by a user that may also view a display device 108 of the computing device.

The bend mechanism 208 may be configured to a variety of ways to form the bend between the first and second members 204, 206. For example, the support mechanism 202 may be configured to include a flexible outer layer (e.g., using a rubber material, woven material, and so on) to flex between the open and closed configurations. A spine may be disposed within the flexible outer layer that is configured to support bending to transition the support mechanism between the closed and open configurations. The spine, for instance, may be formed using a metal having a sufficient structural rigidity to support the rear of the computing device 102 such that the computing device 102 is arranged in an upright configuration when placed on a surface. In this way, a user may bend the metal using one or more hands to place the computing device 102 and a corresponding display device 108 at a desired angle for viewing.

The spine may also be configured as a plurality of ribs that are configured to lock together to form the open configuration and unlock to form the closed configuration. The ribs, for instance, may follow a cam and indent configuration such that the cams engage indentions to form the bend of the open configuration and disengage to form a generally flat arrangement as in the closed and extended configurations of FIGS. 3-5. A variety of other examples are also contemplated without departing from the spirit and scope thereof.

Example Computing Device

Figure 7:
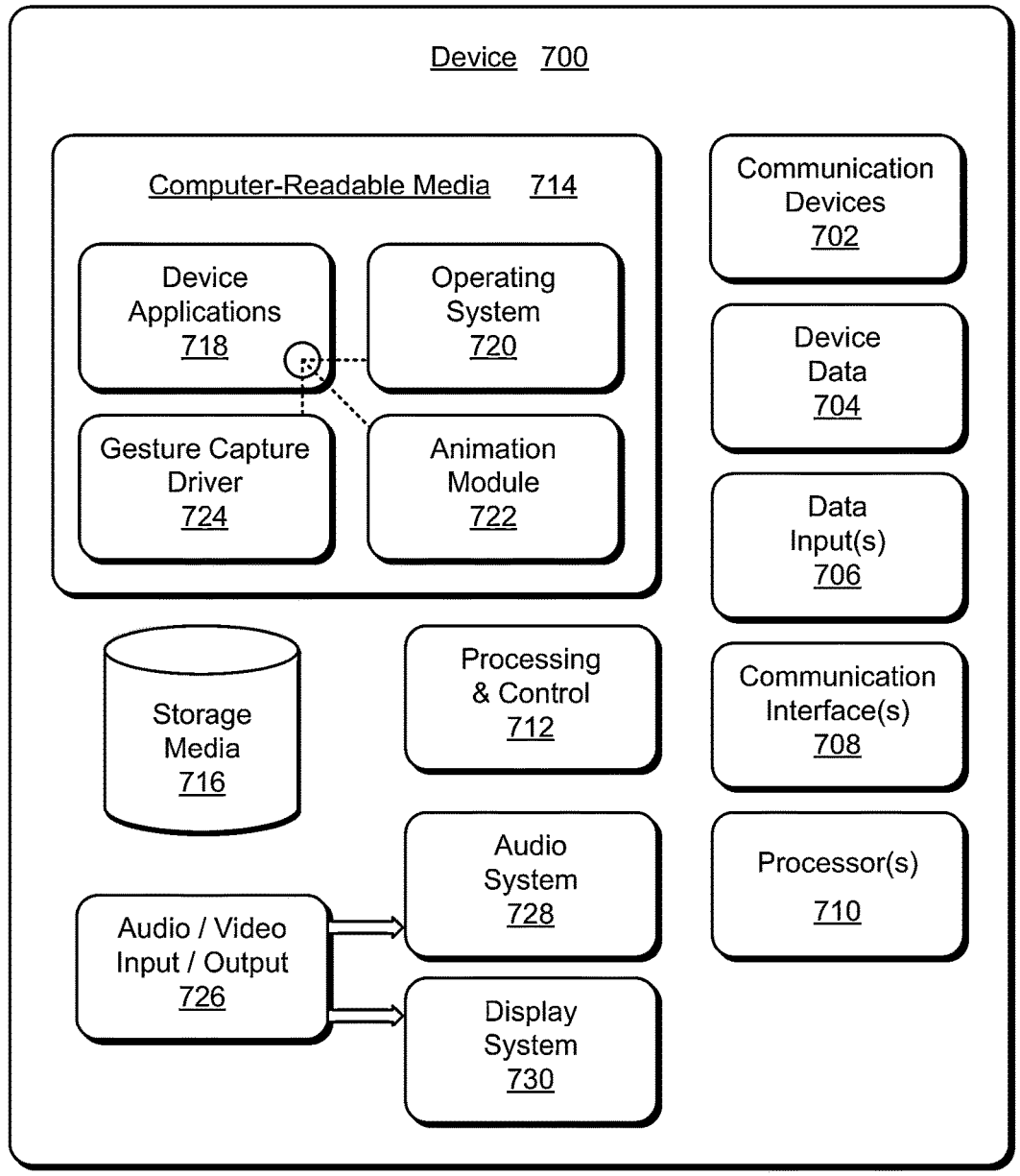
FIG. 7 illustrates an example system including various components of an example device that can be implemented as any type of computing device as described with reference to FIGS. 1-6 to implement embodiments of the techniques described herein.

FIG. 7 illustrates various components of an example device 700 that can be implemented as any type of portable and/or computer device as described with reference to FIGS. 1-6 to implement embodiments of the cover techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of a touch pull-in gesture. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the gesture techniques described herein. In this example, the device applications 718 include an interface application 722 and an input module 724 (which may be the same or different as input module 114) that are shown as software modules and/or computer applications. The input module 724 is representative of software that is used to provide an interface with a device configured to capture inputs, such as a touchscreen, track pad, camera, and so on. Alternatively or in addition, the interface application 722 and the input module 724 can be implemented as hardware, software, firmware, or any combination thereof. Additionally, the input module 724 may be configured to support multiple input devices, such as separate devices to capture touch and stylus inputs, respectively. For example, the device may be configured to include dual display devices, in which one of the display device is configured to capture touch inputs while the other stylus inputs.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
 a housing comprising a first surface, a second surface opposite the first surface and an interior space in between the first and second surfaces;
 input functionality available via the first surface of the housing, the input functionality configured to initiate one or more inputs that are configured to be communicatively coupled to a computing device to initiate one or more operations of the computing device; and
 a support mechanism comprising first and second portions and a spine between the first and second portions, the support mechanism bending at the spine, the support mechanism configured to assume:
 a closed configuration in which the spine is completely disposed within the interior of the housing; and
 an open configuration in which the support mechanism is disposed outside of the housing and arranged to support a rear of the computing device, the support mechanism configured to slide out from the closed configuration which is then flexed to form the open configuration.

2. An apparatus as described in claim 1, wherein the support mechanism is bendable between the closed and open configurations by one or more hands of a user without using tools.

3. An apparatus as described in claim 1, wherein an angle between a surface of a display device of the computing device and a surface of the input functionality, when in the open configuration, is greater than ninety degrees.

4. An apparatus as described in claim 1, wherein an angle between first and second portions of the support mechanism, when bent in relation to each other in the open configuration, is less than ninety degrees.

5. An apparatus as described in claim 1, wherein the support mechanism includes a flexible outer layer and a spine disposed within the flexible outer layer that is configured to support bending to transition the support mechanism between the closed and open configurations.

6. An apparatus as described in claim 5, wherein the spine is configured using a metal having a sufficient structural rigidity to support the rear of the computing device such that the computing device is arranged in an upright configuration when then apparatus is placed on a surface.

7. An apparatus as described in claim 5, wherein the spine is configured using a plurality of ribs that are configured to lock together to form the open configuration and unlock to form the closed configuration.

8. An apparatus as described in claim 5, wherein the spine is configured using the plurality of ribs to lock together using cams and indentions.

9. A system comprising:
 a computing device having a slate configuration;
 a housing comprising a keyboard in a first surface of the housing, and a second surface opposite the first surface, an interior space being defined in between the first and second surfaces; and
 a support mechanism, the support mechanism comprising:
 a first end positioned within the interior of the housing,
 a second end most distant from the first end when the support mechanism is unbent, and
 a spine extending from the first end to the second end where the spine is configured to bend to form an arcuate section between the first end and the second end, wherein the support mechanism is configured to assume a closed configuration in which the support mechanism is disposed within the interior of the housing, and an open configuration in which the support mechanism is disposed outside the housing and bent to have the second end support a rear of the computing device such that an angle of a display device of the computing device is at an angle to the first surface of the housing.

10. A system as described in claim 9, wherein the support mechanism further includes a flexible outer layer and the spine disposed within the flexible outer layer.

11. A system as described in claim 10, wherein the spine is configured using a metal having a sufficient structural rigidity to support the rear of the computing device such that the computing device is arranged in an upright configuration when then apparatus is placed on a surface.

12. A system as described in claim 10, wherein the spine is configured using a plurality of ribs that are configured to lock together to form the open configuration and unlock to form the closed configuration.

13. A system as described in claim 10, wherein the spine is configured using the plurality of ribs to lock together using cams and indentions.

14. A system comprising:
a computing device having a slate configuration;
a housing comprising an input mechanism, in a first surface of the housing, for receiving input for the computing device, and a second surface opposite the first surface, an interior space being defined in between the first and second surfaces; and
a support mechanism, the support mechanism comprising:
a first end positioned within the interior of the housing,
a second end opposite the first end when the support mechanism is unbent, and
a spine extending from the first end to the second end where the spine is configured to bend, wherein the support mechanism is configured to assume a closed configuration in which the support mechanism is disposed within the interior of the housing, and an open configuration in which the support mechanism is disposed outside the housing and bent to have the second end support a rear of the computing device, the support mechanism configured to slide out from the closed configuration which is then flexed to form the open configuration.

15. A system as described in claim 14, wherein the support mechanism includes a flexible outer layer and a spine disposed within the flexible outer layer.

16. A system as described in claim 15, wherein the spine is configured using a plurality of ribs that are configured to lock together to form the open configuration and unlock to form the closed configuration.

17. A system comprising:
a computing device having a slate configuration;
a housing comprising a keyboard in a first surface of the housing, and a second surface opposite the first surface, a back surface extending between the first surface and the second surface and an opening extending into the back surface to form an interior space being defined in between the first and second surfaces; and
a support mechanism, the support mechanism comprising:
a first end positioned within the interior of the housing,
a second end opposite to the first end when the support mechanism is unbent, and
a spine between the first and second ends where the support mechanism is configured to bend, wherein the support mechanism is configured to assume a closed configuration in which the support mechanism is disposed within the interior of the housing with the second end of the support mechanism forming a portion of the back surface of the housing and a portion of the second surface of the housing, and an open configuration in which the support mechanism is disposed outside the housing and the spine is bent such that the second end touches a rear of a display device of the computing device to support the display device such that an angle of the display device of the computing device is at an angle to the first surface of the housing.

18. An apparatus comprising:
a housing comprising a first surface, a second surface opposite the first surface and an interior space in between the first and second surfaces;
input functionality available via the first surface of the housing, the input functionality configured to initiate one or more inputs that are configured to be communicatively coupled to a computing device to initiate one or more operations of the computing device; and
a support mechanism comprising first and second portions and a spine between the first and second portions, the support mechanism bending at the spine, the support mechanism configured to assume:
a closed configuration in which the spine is disposed within the interior of the housing; and
an open configuration in which the support mechanism is disposed outside of the housing and arranged to support a rear of the computing device, the support mechanism configured to slide out from the closed configuration which is then flexed to form the open configuration.

* * * * *